United States Patent
Ji et al.

(10) Patent No.: US 12,300,983 B2
(45) Date of Patent: May 13, 2025

(54) WIRING HARNESS MODULE FOR SLIDING SEAT

(71) Applicants: Hyundai Motor Company, Seoul (KR); Kia Corporation, Seoul (KR); Kyungshin Corp., Incheon (KR)

(72) Inventors: Seong Goo Ji, Gyeonggi-do (KR); Sang Un Lee, Incheon (KR)

(73) Assignees: Hyundai Motor Company, Seoul (KR); Kia Corporation, Seoul (KR); Kyungshin Corp., Incheon (KR)

( * ) Notice: Subject to any disclaimer, the term of this patent is extended or adjusted under 35 U.S.C. 154(b) by 267 days.

(21) Appl. No.: 17/977,180

(22) Filed: Oct. 31, 2022

(65) Prior Publication Data
US 2023/0411940 A1  Dec. 21, 2023

(30) Foreign Application Priority Data

Jun. 20, 2022 (KR) .................. 10-2022-0074973

(51) Int. Cl.
*H02G 3/04* (2006.01)
*B60N 2/90* (2018.01)
*B60R 16/027* (2006.01)
*H02G 11/00* (2006.01)

(52) U.S. Cl.
CPC .............. *H02G 3/0437* (2013.01); *B60N 2/90* (2018.02); *B60R 16/027* (2013.01); *H02G 11/00* (2013.01)

(58) Field of Classification Search
None
See application file for complete search history.

(56) References Cited

U.S. PATENT DOCUMENTS

| | | | |
|---|---|---|---|
| 9,024,190 B2* | 5/2015 | Terada | B60R 16/0215 174/72 A |
| 10,773,663 B2* | 9/2020 | Sano | H02G 3/0437 |
| 2006/0030174 A1* | 2/2006 | Tsubaki | B60N 2/06 439/76.2 |
| 2009/0020331 A1* | 1/2009 | Tsubaki | B60R 16/0207 174/72 A |
| 2016/0304036 A1* | 10/2016 | Iwamoto | B60R 13/0237 |
| 2018/0178751 A1* | 6/2018 | Katsuramaki | B60R 16/027 |
| 2020/0139907 A1* | 5/2020 | Sano | B60N 2/0715 |

FOREIGN PATENT DOCUMENTS

KR  20-2010-0006903 U  7/2010

* cited by examiner

*Primary Examiner* — Krystal Robinson
(74) *Attorney, Agent, or Firm* — Fox Rothschild LLP

(57) ABSTRACT

The present disclosure provides a wiring harness module for a sliding seat, the wiring harness module including a sliding casing, a connector holder installed in the sliding casing and configured to be slidable in a sliding direction of a seat, a sliding connector provided on the connector holder and formed to be electrically connected to the seat, a joint connector formed to be electrically connected to an external configuration, and a flat flexible cable (FFC) configured to electrically connect the joint connector and the sliding connector while absorbing a sliding motion of the connector holder.

17 Claims, 5 Drawing Sheets

WIRING HARNESS MODULE FOR SLIDING SEAT

CROSS REFERENCE TO RELATED APPLICATION

The present application claims under 35 U.S.C. § 119(a) the benefit of Korean Patent Application No. 10-2022-0074973, filed Jun. 20, 2022, the entire contents of which is incorporated herein for all purposes by this reference.

BACKGROUND

Field of the Disclosure

Embodiments of the present disclosure relate to a technology for defining an electrical connection relationship between a vehicle body and a seat slidably mounted in a vehicle.

Background

A seat for a vehicle is mounted to be slidable in a forward/rearward direction on a floor of a vehicle body. A position of the seat with respect to the vehicle body may vary depending on a user's demand, such that the user may more conveniently use the seat.

Because the seat is equipped with a reclining device, a heating wire, and the like, power needs to be supplied to the seat from the vehicle body, and various electrical signals need to be transmitted between the seat and the vehicle body in order to control the above-mentioned devices. Therefore, an electric wire or the like is required to electrically connect the seat and the vehicle body.

In the related art, the seat and the vehicle body are connected by a wiring harness simply including a plurality of electric wires. However, the wiring harness exposed between the vehicle body and the seat is disadvantageous in aesthetic appearance, and there is a high risk that a passenger's foot is caught by the wiring harness, and the wiring harness is damaged.

The foregoing explained as the background of the disclosure is intended merely to aid in the understanding of the background of the present disclosure, and is not intended to mean that the present disclosure falls within the purview of the related art that is already known to those skilled in the art.

SUMMARY OF THE DISCLOSURE

The present disclosure is proposed to solve these problems and aims to provide a wiring harness module for a sliding seat, which is capable of allowing a seat to slide relative to a vehicle body, consistently and stably providing an electrical connection relationship between the vehicle body and the seat, implementing an excellent aesthetic appearance having no electric wire exposed to the outside when the seat slides, eliminating a risk that a user's foot is caught by the wiring harness module, and ensuring excellent durability.

In one aspect, a wiring harness module for a sliding seat, is provided the wiring harness module comprising: a) a sliding casing comprising a connector holder; b) the connector holder configured to be slidable in a sliding direction of a seat; c) a sliding connector associated with or provided on the connector holder and formed to be electrically connected to the seat; d) a joint connector that can be electrically connected to an external configuration or source; and e) a flat flexible cable (FFC) configured to electrically connect the joint connector and the sliding connector.

In a further aspect, the present disclosure provides a wiring harness module for a sliding seat, the wiring harness module including: a sliding casing; a connector holder installed in the sliding casing and configured to be slidable in a sliding direction of a seat; a sliding connector provided on the connector holder and formed to be electrically connected to the seat; a joint connector formed to be electrically connected to an external configuration; and a flat flexible cable (FFC) configured to electrically connect the joint connector and the sliding connector while absorbing a sliding motion of the connector holder.

The sliding casing may be installed below the seat, the connector holder may be installed to slide in a state in which a part of the connector holder protrudes from an upper side of the sliding casing, the sliding casing may have a sliding hole penetrated by the connector holder, and blocking members may be provided in the sliding hole and block penetration of foreign substances while allowing a movement of the connector holder.

The sliding casing may include a sliding body and a sliding cover separably provided at two opposite sides based on the sliding hole, and the sliding body and the sliding cover may respectively have sliding guides configured to guide the straight sliding motion of the connector holder.

The blocking members may be made of an elastically deformable material.

The blocking members may be configured as brushes respectively installed on a portion of the sliding cover and a portion of the sliding body that define the sliding hole.

A guide hole may be formed in a lower surface of the sliding casing, and a lower end of the connector holder may be inserted into the guide hole so that the straight sliding motion is guided.

The FFC may have one end connected to the sliding connector through the connector holder and the other end connected to the joint connector, and the FFC may be fixed to the sliding casing so as to be consistently kept bent in a 'U' shape when the connector holder slides.

The FFC may extend to protrude to the outside of the sliding casing, and the joint connector may be connected to the FFC at the outside of the sliding casing.

Only some of the components, which are adjacent to the joint connector among the components positioned in the sliding casing, may be fixed to the sliding casing so that the FFC defines a U shape when the connector holder slides.

In addition, to achieve the above-mentioned object, the present disclosure provides a wiring harness module for a sliding seat, the wiring harness module including: a connector holder configured to slide in conjunction with a straight sliding motion of a seat; a sliding connector provided on the connector holder and electrically connected to the seat; a sliding casing installed to guide the sliding motion of the connector holder; and a flat flexible cable (FFC) configured to absorb the sliding motion of the connector holder and having one end connected to the sliding connector through the connector holder and the other end connected to a joint connector.

The FFC may be installed in the sliding casing and absorb the sliding motion of the connector holder while a portion bent in a U shape is changed as the connector holder slides.

A part of the FFC, which is adjacent to the joint connector, may be fixed to the sliding casing, and the FFC may be installed such that a portion, which extends from a portion fixed to the sliding casing to a portion connected to the connector holder, has a U shape.

The joint connector may be connected to the FFC at the outside of the sliding casing.

A sliding hole may be formed at an upper side of the connector holder and penetrated by the connector holder, blocking members may be provided in the sliding hole and easily deformed by the connector holder, and the blocking members may be elastically deformable to block penetration of foreign substances.

The blocking members may be made of an elastically deformable material.

The blocking members may be configured as brushes respectively installed at two opposite sides of the sliding hole.

The sliding casing may include a sliding body and a sliding cover that divide the sliding hole into two parts in a longitudinal direction.

The sliding body and the sliding cover may respectively have sliding guides configured to guide the straight sliding motion of the connector holder, and a guide groove corresponding to the sliding guide may be formed in the connector holder.

According to the present disclosure, it is possible to provide the wiring harness module for a sliding seat, which is capable of allowing the seat to slide relative to the vehicle body, consistently and stably providing the electrical connection relationship between the vehicle body and the seat, implementing an excellent aesthetic appearance having no electric wire exposed to the outside when the seat slides, eliminating a risk that the user's foot is caught by the wiring harness module, and ensuring excellent durability.

As discussed, the method and system suitably include use of a controller or processor.

In another embodiment, vehicles are provided that comprise an apparatus as disclosed herein. For instance, a vehicle is provided that comprises wiring harness module for a sliding seat of the vehicle where the wiring harness module comprises: a) a sliding casing comprising a connector holder; b) the connector holder configured to be slidable in a sliding direction of the vehicle seat; c) a sliding connector associated with or provided on the connector holder and formed to be electrically connected to the vehicle seat; d) a joint connector that can be electrically connected to an external configuration or source; and e) a flat flexible cable (FFC) configured to electrically connect the joint connector and the sliding connector. Other aspects are disclosed infra.

BRIEF DESCRIPTION OF THE DRAWINGS

FIGS. 6 and 7 are views illustrating states in which the wiring harness module according to the present disclosure is applied to a sliding seat, in which FIG. 6 illustrates a state in which the seat is moved relatively rearward, and FIG. 7 illustrates a state in which the seat is moved relatively forward.

DETAILED DESCRIPTION OF THE DISCLOSURE

Figure 1:
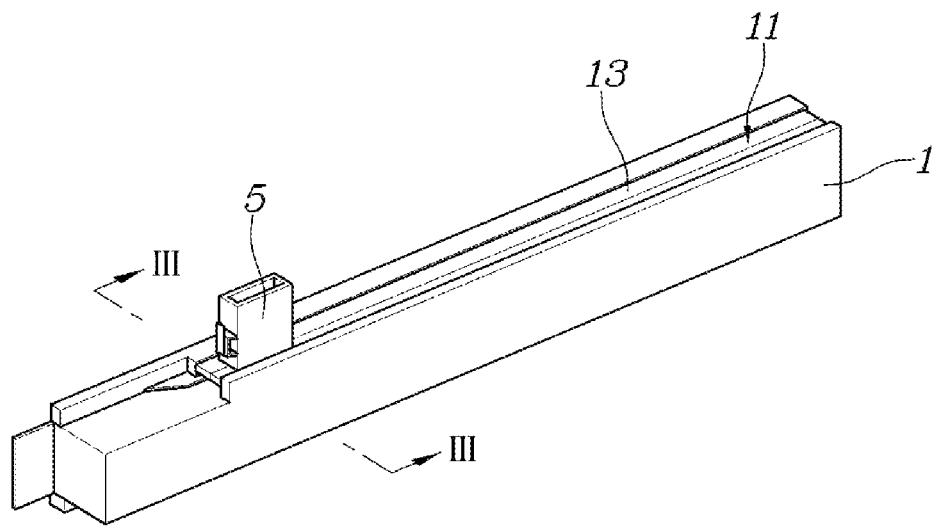
FIG. 1 is a view illustrating an embodiment of a wiring harness module for a sliding seat according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions of embodiments of the present disclosure disclosed in this specification or application are exemplified only for the purpose of explaining the embodiments according to the present disclosure, the embodiments according to the present disclosure may be carried out in various forms, and it should not be interpreted that the present disclosure is limited to the embodiments described in this specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present disclosure pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present disclosure will be described in detail through description of preferred embodiments of the present disclosure with reference to the accompanying drawings. Like reference numerals indicated in the respective drawings refer to like members.

Referring to FIGS. 1 to 7, a wiring harness module for a sliding seat according to an embodiment of the present disclosure may include: a sliding casing 1; a connector holder 5 installed in the sliding casing 1 and configured to be slidable in a sliding direction of a seat 3; a sliding connector 7 provided on the connector holder 5 and electrically connected to the seat 3; a joint connector 9 electrically connected to an external configuration; and a flat flexible cable (FFC) configured to electrically connect the joint connector 9 and the sliding connector 7 while absorbing a sliding motion of the connector holder 5.

That is, in the present disclosure embodiment, when the seat 3 slides, the sliding connector 7 and the connector holder 5 slide straight together with the seat 3. The sliding connector 7 may be connected to an electric device of the seat 3, the joint connector 9 may be connected to a power source and an operating device provided on a vehicle body, and an electrical signal may be consistently and stably transmitted to the seat 3 through the FFC from the power source, the operating device, and the like.

The sliding casing 1 may be installed below the seat 3. For example, the sliding casing 1 may be installed on a floor of the vehicle body.

The connector holder 5 may be installed to slide in a state of partially protruding from an upper side of the sliding casing 1. The sliding casing 1 has a sliding hole 11 penetrated by the connector holder 5. Blocking members 13 are provided in the sliding hole 11 and configured to allow a movement of the connector holder 5 but block the penetration of foreign substances.

The sliding casing 1 may include a sliding body 15 and a sliding cover 17 that are separably provided at two opposite sides based on the sliding hole 11. Therefore, the FFC and the connector holder 5 may be easily assembled or disassembled in the sliding casing 1.

The sliding body 15 and the sliding cover 17 respectively may have sliding guides 19 configured to guide the straight sliding motion of the connector holder 5.

Therefore, when the connector holder 5 slides together with the seat 3, the sliding guides 19 may smoothly guide the straight sliding motion of the connector holder 5.

Meanwhile, the blocking members 13 may be configured as brushes respectively installed on a portion of the sliding cover 17 and a portion of the sliding body 15 that define the sliding hole 11.

Therefore, the sliding hole 11 of the sliding casing 1 may be typically maintained in a state in which the blocking members 13 block the sliding hole 11 to prevent dust or foreign substances from penetrating into the sliding casing 1. When the connector holder 5 slides together with the seat 3, the blocking members 13 are deformed to enable the connector holder to freely move.

In addition, the blocking member 13 may be made of an elastically deformable material such as a sponge or rubber plate in addition to the brush.

Figure 4:
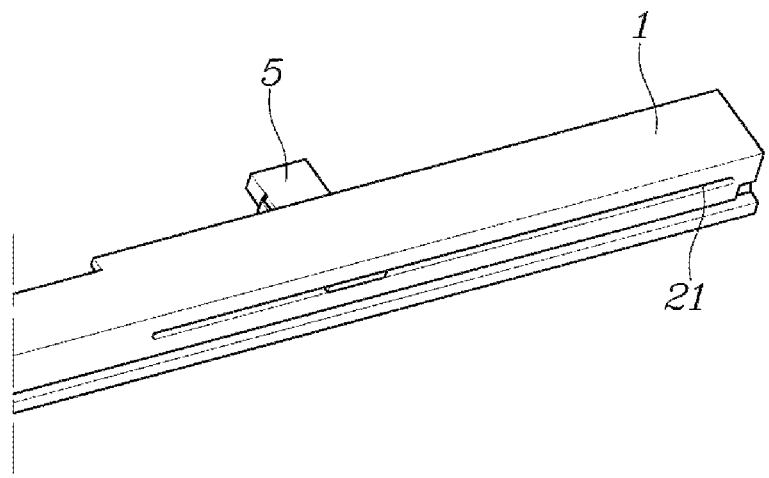
FIG. 4 is a view illustrating a lower side of the wiring harness module in FIG. 1.
Figure 5:
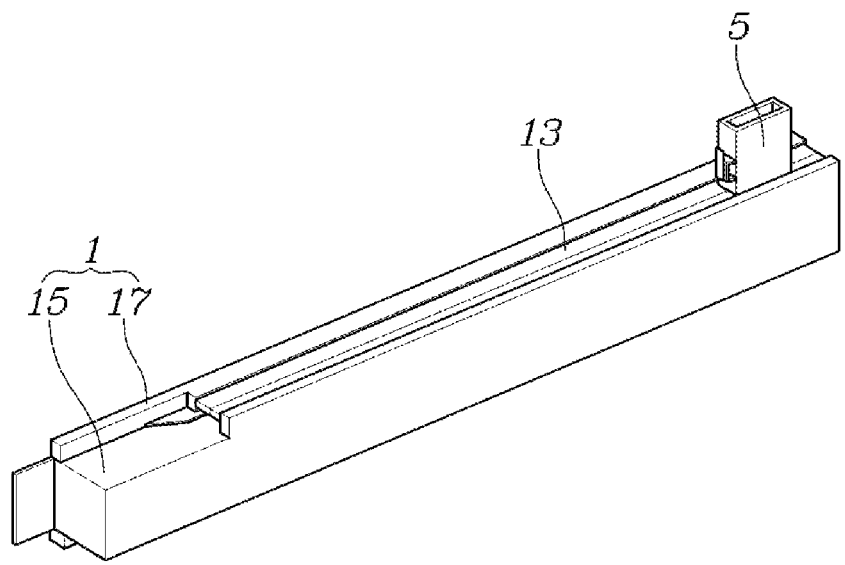
FIG. 5 is a view illustrating a state in which a connector holder is moved rearward from the wiring harness module in FIG. 1.

As illustrated in FIG. 4, a guide hole 21 may be formed in a lower surface of the sliding casing 1, and a lower end of the connector holder 5 may be inserted into the guide hole 21, such that the straight sliding motion may be guided by the guide hole 21.

Therefore, the straight sliding motion of the connector holder 5 may be more smoothly and securely guided.

Meanwhile, one end of the FFC may be connected to the sliding connector 7 through the connector holder 5, and the other end of the FFC may be connected to the joint connector 9. The FFC is fixed to the sliding casing 1 so that the FFC is consistently kept bent in a 'U' shape when the connector holder 5 slides.

In the present embodiment, the FFC may extend to protrude to the outside of the sliding casing 1, and the joint connector 9 may be structured to be connected to the FFC from the outside of the sliding casing 1.

Only some components, which are adjacent to the joint connector 9 among the components positioned in the sliding casing 1, may be fixed to the sliding casing 1 so that the FFC defines a U shape when the connector holder 5 slides.

Figure 2:
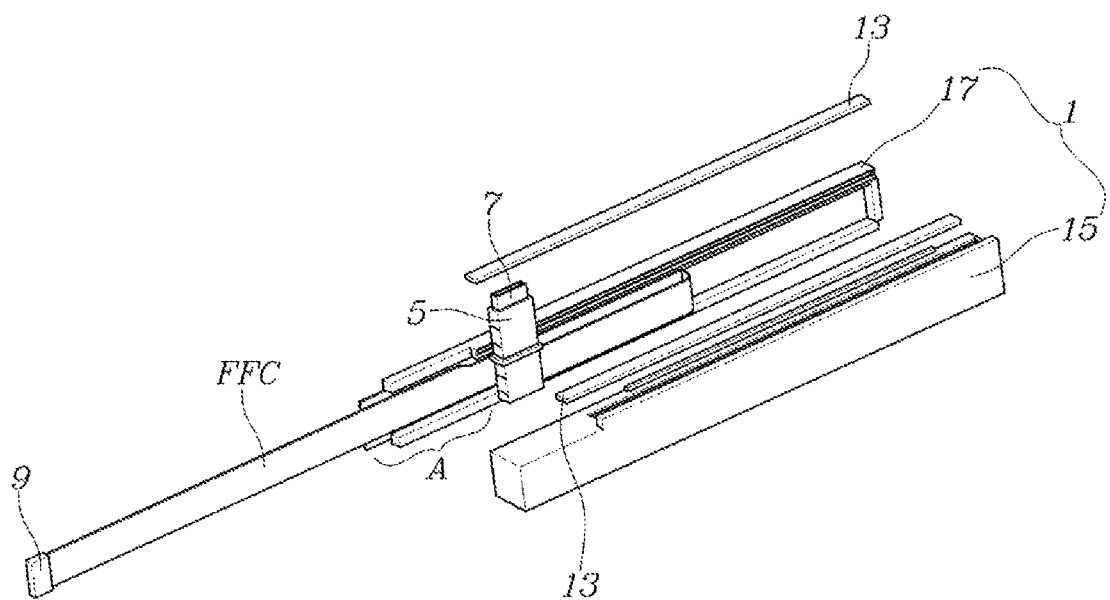
FIG. 2 is an exploded perspective view of a wiring harness module in FIG. 1.
Figure 3:
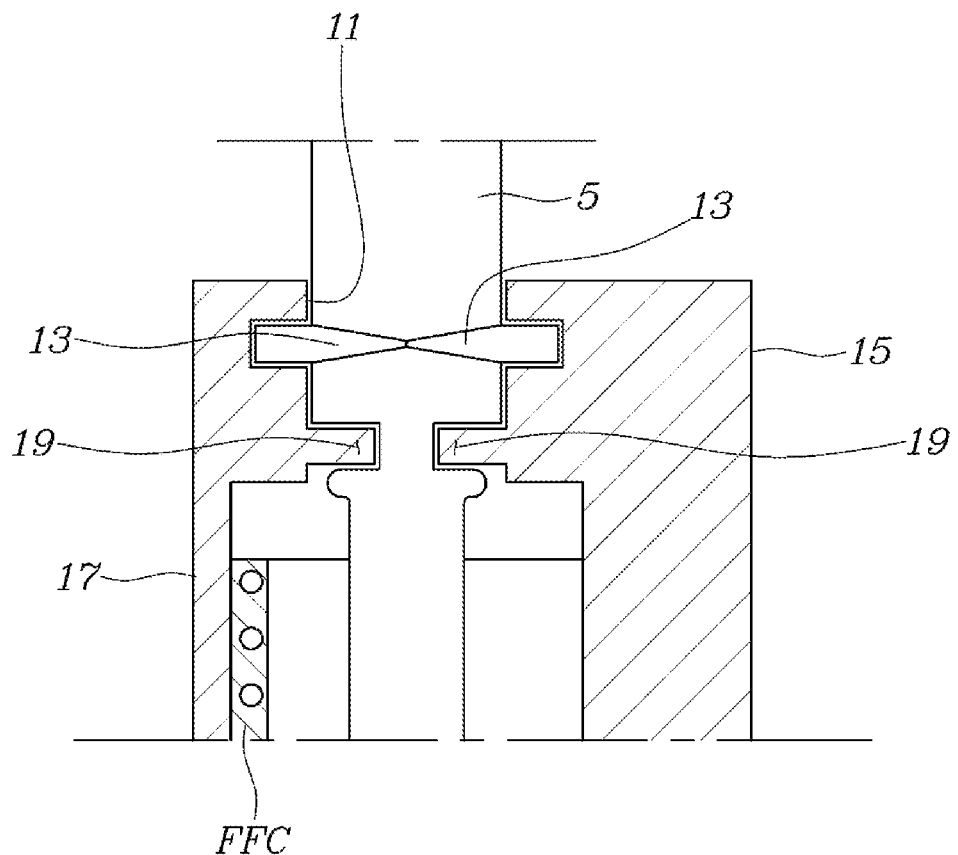
FIG. 3 is a cross-sectional view taken along line in FIG. 1.

For reference, in FIG. 2, the part indicated by A may be a portion of the FFC fixed to the sliding casing 1.

Figure 6:
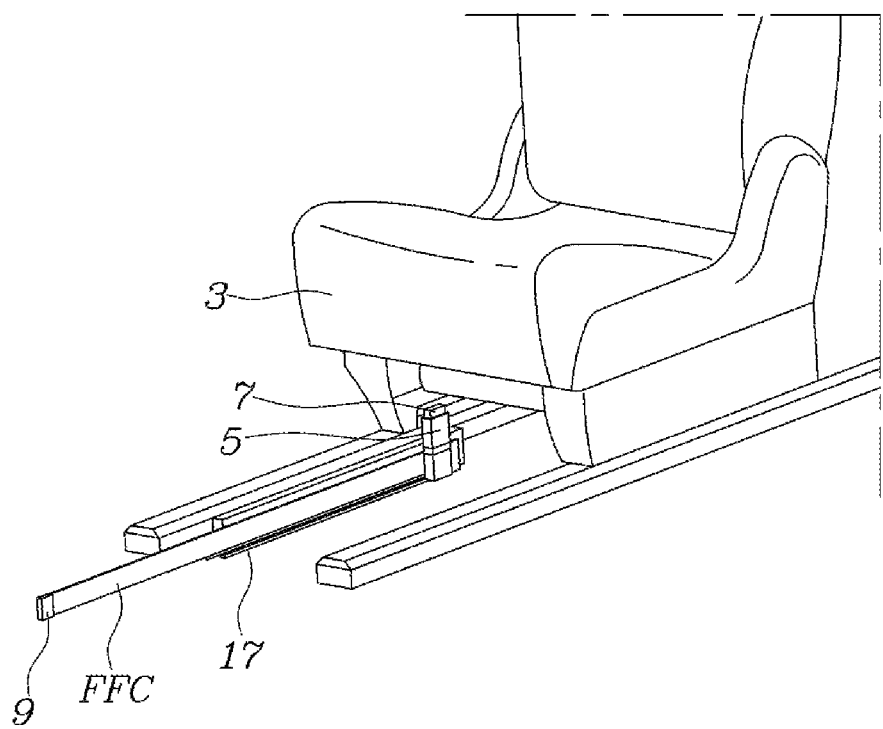
Figure 7:
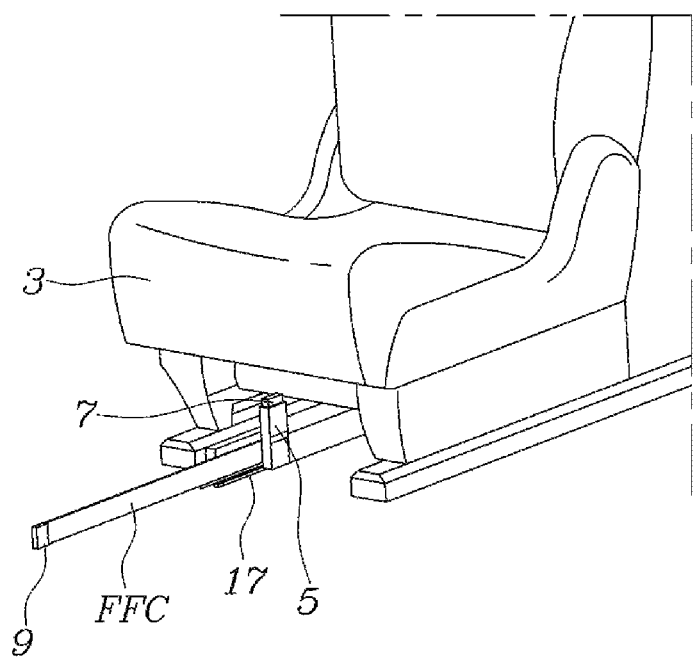

Therefore, when the connector holder 5 slides straight together with the seat 3, the FFC is kept fixed to the sliding casing 1, but the end of the FFC connected to the connector holder 5 and the portion of the FFC, which defines the U shape, are changed as illustrated in FIGS. 6 and 7 that illustrates the comparison.

Therefore, the FFC may serve to consistently and stably maintain an electrical connection relationship between the joint connector 9 and the sliding connector 7 while absorbing a displacement of the sliding connector 7 that moves relative to the joint connector 9 in a fixed state.

Therefore, as illustrated in FIGS. 6 and 7, unlike the related art, there may be no exposed wiring harness that degrades an aesthetic appearance. Therefore, there is almost no risk that a passenger is caught by the wiring harness and the wiring harness is damaged.

The present disclosure embodiment may be expressed as follows.

That is, the present disclosure embodiment may include: the connector holder 5 configured to slide in conjunction with the straight sliding motion of the seat 3; the sliding connector 7 provided on the connector holder 5 and electrically connected to the seat 3; the sliding casing 1 installed to guide the sliding motion of the connector holder 5; and the FFC configured to absorb the sliding motion of the connector holder 5 and having one end connected to the sliding connector 7 through the connector holder 5 and the other end connected to the joint connector 9.

The FFC may be installed in the sliding casing 1 and absorb the sliding motion of the connector holder 5 while the portion bent in the U shape is changed as the connector holder 5 slides.

A part of the FFC, which is adjacent to the joint connector 9, may be fixed to the sliding casing 1. The FFC may be installed such that a portion of the FFC, which extends from the portion fixed to the sliding casing 1 to the portion connected to the connector holder 5, has a U shape.

The joint connector 9 may be connected to the FFC at the outside of the sliding casing 1.

The sliding hole 11 may be formed at the upper side of the connector holder 5 and penetrated by the connector holder 5. The elastically deformable blocking members 13 may be provided in the sliding hole 11. The blocking members 13 may be easily deformed by the connector holder 5, and the blocking members 13 may be elastically deformed to block the penetration of foreign substances.

The blocking members 13 may be configured as brushes respectively installed at two opposite sides of the sliding hole 11. The sliding casing 1 may include the sliding body 15 and the sliding cover 17 that divide the sliding hole 11 into two parts in a longitudinal direction.

The sliding body 15 and the sliding cover 17 respectively may have the sliding guides 19 configured to guide the straight sliding motion of the connector holder 5. A guide groove corresponding to the sliding guide 19 may be formed in the connector holder 5.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A wiring harness module for a sliding seat, the wiring harness module comprising:
    a sliding casing comprising a connector holder;
    the connector holder configured to be slidable in a sliding direction of a seat;
    a sliding connector provided on the connector holder and formed to be electrically connected to the seat;
    a joint connector formed to be electrically connected to an external configuration; and
    a flat flexible cable (FFC) configured to electrically connect the joint connector and the sliding connector;
    wherein the sliding casing is configured to be installed below the seat, the connector holder is configurer to be installed to slide in a state in which a part of the connector holder protrudes from an upper side of the sliding casing, the sliding casing has a sliding hole penetrated by the connector holder, and blocking member re provided in the sliding hole and block of foreign substances while allowing a movement of the connector holder; and
    wherein the sliding casing comprises a sliding body and a sliding cover separably provided at two opposite sides based on the sliding hole, and the sliding body and the sliding cover respectively have sliding guides configured to guide the straight sliding motion of the connector holder.

2. The wiring harness module of claim 1, wherein the blocking members are made of an elastically deformable material.

3. The wiring harness module of claim 1, wherein the blocking members are configured as brushes respectively installed on a portion of the sliding cover and a portion of the sliding body that define the sliding hole.

4. The wiring harness module of claim 1, wherein a guide hole is formed in a lower surface of the sliding casing, and a lower end of the connector holder is inserted into the guide hole so that the straight sliding motion is guided.

5. The wiring harness module of claim 1, wherein the FFC has one end connected to the sliding connector through the connector holder and the other end connected to the joint connector, and the FFC is fixed to the sliding casing so as to be consistently kept bent in a 'U' shape when the connector holder slides.

6. The wiring harness module of claim 5, wherein the FFC extends to protrude to the outside of the sliding casing, and the joint connector is connected to the FFC at the outside of the sliding casing.

7. The wiring harness module of claim 6, wherein only some of the components, which are adjacent to the joint connector among the components positioned in the sliding casing, are fixed to the sliding casing so that the FFC defines a U shape when the connector holder slides.

8. A vehicle comprising the harness module of claim 1.

9. A wiring harness module for a sliding seat, the wiring harness module comprising:
    a connector holder configured to slide in conjunction with a straight sliding motion of a seat;

a sliding connector provided on the connector holder and electrically connected to the seat;

a sliding casing installed to guide the sliding motion of the connector holder; and a flat flexible cable (FFC) configured to absorb the sliding motion of the connector holder and having one end connected to the sliding connector through the connector holder;

wherein a sliding hole is formed at an upper side of the connector holder and penetrated by the connector holder, blocking members are provided in the sliding hole and easily deformed by the connector holder, and the blocking members are elastically deformable to block penetration of foreign substances.

10. The wiring harness module of claim 9, wherein the other end of the FFC is connected to a joint connector.

11. The wiring harness module of claim 10, wherein a part of the FFC, which is adjacent to the joint connector, is fixed to the sliding casing, and the FFC is installed such that a portion, which extends from a portion fixed to the sliding casing to a portion connected to the connector holder, has a U shape.

12. The wiring harness module of claim 11, wherein the joint connector is connected to the FFC at the outside of the sliding casing.

13. The wiring harness module of claim 9, wherein the FFC is installed in the sliding casing and absorbs the sliding motion of the connector holder while a portion bent in a U shape is changed as the connector holder slides.

14. The wiring harness module of claim 9, wherein the blocking members are configured as brushes respectively installed at two opposite sides of the sliding hole.

15. The wiring harness module of claim 9, wherein the sliding casing comprises a sliding body and a sliding cover that divide the sliding hole into two parts in a longitudinal direction.

16. The wiring harness module of claim 9, wherein the blocking members are made of an elastically deformable material.

17. The wiring harness module of claim 9, wherein the sliding body and the sliding cover respectively have sliding guides configured to guide the straight sliding motion of the connector holder, and a guide groove corresponding to the sliding guide is formed in the connector holder.

* * * * *